(12) United States Patent
DeHaan (10) Patent No.: US 9,250,672 B2
(45) Date of Patent: Feb. 2, 2016

(54) CLONING TARGET MACHINES IN A SOFTWARE PROVISIONING ENVIRONMENT

(75) Inventor: Michael Paul DeHaan, Morrisville, NC (US)

(73) Assignee: Red Hat, Inc., Raleigh, NC (US)

(*) Notice: Subject to any disclaimer, the term of this patent is extended or adjusted under 35 U.S.C. 154(b) by 663 days.

(21) Appl. No.: 12/473,014

(22) Filed: May 27, 2009

(65) Prior Publication Data

US 2010/0306337 A1  Dec. 2, 2010

(51) Int. Cl.
 G06F 9/445 (2006.01)
 G06F 1/26 (2006.01)

(52) U.S. Cl.
 CPC . *G06F 1/266* (2013.01); *G06F 8/63* (2013.01)

(58) Field of Classification Search
 CPC .............................. G06F 15/167; G06F 8/63
 USPC ................... 709/213, 220; 713/300
 See application file for complete search history.

(56) References Cited

U.S. PATENT DOCUMENTS

| | | | |
|---|---|---|---|
| 5,742,818 A * | 4/1998 | Shoroff | G06F 17/30076 |
| 5,787,246 A | 7/1998 | Lichtman et al. | |
| 5,835,719 A | 11/1998 | Gibson et al. | |
| 5,948,062 A | 9/1999 | Tzelnic et al. | |
| 6,105,100 A | 8/2000 | Dean et al. | |
| 6,212,585 B1 | 4/2001 | Chrabaszcz | |
| 6,243,747 B1 | 6/2001 | Lewis et al. | |
| 6,272,536 B1 | 8/2001 | van Hoff et al. | |
| 6,381,742 B2 | 4/2002 | Forbes et al. | |
| 6,385,766 B1 * | 5/2002 | Doran et al. | 717/174 |
| 6,415,289 B1 | 7/2002 | Williams et al. | |
| 6,438,711 B2 | 8/2002 | Woodruff | |
| 6,516,427 B1 | 2/2003 | Keyes et al. | |
| 6,526,442 B1 | 2/2003 | Stupek et al. | |
| 6,550,021 B1 | 4/2003 | Dalphy et al. | |
| 6,557,169 B1 | 4/2003 | Erpeldinger | |
| 6,594,664 B1 | 7/2003 | Estrada et al. | |
| 6,625,742 B1 | 9/2003 | Owhadi et al. | |
| 6,686,838 B1 | 2/2004 | Rezvani et al. | |
| 6,751,659 B1 | 6/2004 | Fenger et al. | |
| 6,757,837 B1 | 6/2004 | Platt et al. | |
| 6,769,022 B1 | 7/2004 | DeKoning et al. | |
| 6,779,004 B1 | 8/2004 | Zintel | |
| 6,845,464 B2 | 1/2005 | Gold | |
| 6,865,737 B1 | 3/2005 | Lucas et al. | |
| 6,947,939 B2 | 9/2005 | Fujibayashi et al. | |
| 6,986,033 B2 | 1/2006 | Miyamoto et al. | |
| 7,013,461 B2 | 3/2006 | Hellerstein et al. | |

(Continued)

OTHER PUBLICATIONS

DeHaan, "Systems and Methods for Providing Configuration Management Services from a Provisioning Server", U.S. Appl. No. 12/414,941, filed Mar. 31, 2009.

(Continued)

*Primary Examiner* — Jimmy H Tran (74) *Attorney, Agent, or Firm* — Lowenstein Sandler LLP (57) ABSTRACT

The transferring of storage content is disclosed. The method may include providing an agent to a target machine in a network of target machines, where the agent is configured to copy storage contents of the target machine. The method may further include receiving the copied storage contents. The method may further include providing the agent to another target machine in the network of target machines, where the agent is configured to transfer the copied storage contents to the other target machine.

21 Claims, 4 Drawing Sheets

(56) References Cited

U.S. PATENT DOCUMENTS

| | | |
|---|---|---|
| 7,051,101 B1 | 5/2006 | Dubrovsky et al. |
| 7,062,676 B2 * | 6/2006 | Shinohara et al. ............... 714/15 |
| 7,107,330 B1 | 9/2006 | Hamilton et al. |
| 7,133,822 B1 | 11/2006 | Jacobson |
| 7,152,109 B2 * | 12/2006 | Suorsa et al. ................. 709/226 |
| 7,165,109 B2 | 1/2007 | Chiloyan et al. |
| 7,185,071 B2 | 2/2007 | Berg et al. |
| 7,200,845 B2 | 4/2007 | Morrison et al. |
| 7,213,065 B2 * | 5/2007 | Watt ...................... G06F 9/4401 709/220 |
| 7,340,637 B2 | 3/2008 | Nagoya |
| 7,350,112 B2 | 3/2008 | Fox et al. |
| 7,356,679 B1 * | 4/2008 | Le et al. ............................ 713/1 |
| 7,395,322 B2 | 7/2008 | Harvey et al. |
| 7,506,040 B1 | 3/2009 | Rabe et al. |
| 7,506,151 B2 | 3/2009 | Miyamoto et al. |
| 7,516,218 B2 | 4/2009 | Besson |
| 7,519,691 B2 | 4/2009 | Nichols et al. |
| 7,574,481 B2 | 8/2009 | Moore et al. |
| 7,600,005 B2 * | 10/2009 | Jamkhedkar et al. ......... 709/220 |
| 7,606,868 B1 | 10/2009 | Le et al. |
| 7,640,325 B1 | 12/2009 | DeKoning et al. |
| 7,681,080 B2 | 3/2010 | Abali et al. |
| 7,716,316 B2 | 5/2010 | Nichols et al. |
| 7,734,717 B2 | 6/2010 | Saarimaki et al. |
| 7,827,261 B1 | 11/2010 | Griswold et al. |
| 7,831,997 B2 | 11/2010 | Eldar et al. |
| 7,873,684 B2 * | 1/2011 | Souder ............... G06F 17/3038 707/825 |
| 7,937,437 B2 | 5/2011 | Fujii |
| 7,990,994 B1 * | 8/2011 | Yeh .................... H04L 12/4641 370/431 |
| 8,006,241 B2 * | 8/2011 | Dias .............................. 717/174 |
| 8,694,763 B2 * | 4/2014 | Thorsen ............... G06F 21/575 713/1 |
| 8,713,295 B2 * | 4/2014 | Bax ..................... G06F 13/14 713/1 |
| 2002/0053047 A1 * | 5/2002 | Gold ............................... 714/45 |
| 2002/0062259 A1 | 5/2002 | Katz et al. |
| 2002/0078186 A1 | 6/2002 | Engel et al. |
| 2002/0138567 A1 | 9/2002 | Ogawa |
| 2002/0156874 A1 * | 10/2002 | Suorsa et al. ................. 709/220 |
| 2002/0162028 A1 | 10/2002 | Kennedy |
| 2003/0005097 A1 | 1/2003 | Barnard et al. |
| 2003/0055919 A1 | 3/2003 | Fong et al. |
| 2003/0069884 A1 | 4/2003 | Nair et al. |
| 2003/0069946 A1 | 4/2003 | Nair et al. |
| 2003/0070110 A1 | 4/2003 | Aija et al. |
| 2003/0074549 A1 | 4/2003 | Paul et al. |
| 2003/0110173 A1 | 6/2003 | Marsland |
| 2003/0119480 A1 | 6/2003 | Mohammad |
| 2003/0126585 A1 | 7/2003 | Parry |
| 2003/0195921 A1 * | 10/2003 | Becker et al. ................. 709/200 |
| 2003/0212992 A1 | 11/2003 | Ronning et al. |
| 2004/0006616 A1 | 1/2004 | Quinn et al. |
| 2004/0015831 A1 | 1/2004 | Bowhill |
| 2004/0015957 A1 | 1/2004 | Zara et al. |
| 2004/0019876 A1 | 1/2004 | Dravida et al. |
| 2004/0024984 A1 | 2/2004 | Lanzatella et al. |
| 2004/0044643 A1 | 3/2004 | deVries et al. |
| 2004/0054789 A1 | 3/2004 | Breh et al. |
| 2004/0059703 A1 | 3/2004 | Chappell et al. |
| 2004/0064501 A1 | 4/2004 | Jan et al. |
| 2004/0128375 A1 | 7/2004 | Rockwell |
| 2004/0143664 A1 | 7/2004 | Usa et al. |
| 2004/0167975 A1 | 8/2004 | Hwang et al. |
| 2004/0215755 A1 | 10/2004 | O'Neill |
| 2004/0223469 A1 | 11/2004 | Bahl et al. |
| 2005/0028025 A1 | 2/2005 | Zalewski et al. |
| 2005/0050175 A1 * | 3/2005 | Fong et al. .................... 709/220 |
| 2005/0102562 A1 * | 5/2005 | Shinohara et al. ............... 714/15 |
| 2005/0114474 A1 | 5/2005 | Anderson et al. |
| 2005/0125525 A1 | 6/2005 | Zhou et al. |
| 2005/0138164 A1 * | 6/2005 | Burton et al. ................. 709/224 |
| 2005/0177829 A1 * | 8/2005 | Vishwanath ................. 717/177 |
| 2005/0182796 A1 | 8/2005 | Chu et al. |
| 2005/0198629 A1 * | 9/2005 | Vishwanath ................. 717/174 |
| 2005/0223374 A1 | 10/2005 | Wishart et al. |
| 2006/0004917 A1 * | 1/2006 | Wang et al. .................... 709/223 |
| 2006/0041767 A1 | 2/2006 | Maxwell et al. |
| 2006/0080659 A1 | 4/2006 | Ganji |
| 2006/0095230 A1 | 5/2006 | Grier et al. |
| 2006/0095702 A1 | 5/2006 | Hickman et al. |
| 2006/0155857 A1 | 7/2006 | Feenan et al. |
| 2006/0173912 A1 | 8/2006 | Lindvall et al. |
| 2006/0174018 A1 | 8/2006 | Zhu et al. |
| 2006/0190575 A1 | 8/2006 | Harvey et al. |
| 2006/0190773 A1 | 8/2006 | Rao et al. |
| 2006/0200658 A1 | 9/2006 | Penkethman |
| 2006/0215575 A1 | 9/2006 | Horton et al. |
| 2006/0218544 A1 | 9/2006 | Chakraborty et al. |
| 2006/0230165 A1 * | 10/2006 | Zimmer et al. ............... 709/230 |
| 2006/0282479 A1 | 12/2006 | Johnson et al. |
| 2007/0015538 A1 | 1/2007 | Wang |
| 2007/0058657 A1 * | 3/2007 | Holt et al. ...................... 370/438 |
| 2007/0067419 A1 | 3/2007 | Bennett |
| 2007/0101118 A1 | 5/2007 | Raghunath et al. |
| 2007/0118654 A1 | 5/2007 | Jamkhedkar et al. |
| 2007/0168721 A1 | 7/2007 | Luiro et al. |
| 2007/0169093 A1 | 7/2007 | Logan et al. |
| 2007/0192158 A1 | 8/2007 | Kim |
| 2007/0204338 A1 | 8/2007 | Aiello et al. |
| 2007/0226810 A1 | 9/2007 | Hotti |
| 2007/0244996 A1 | 10/2007 | Ahmed et al. |
| 2007/0276905 A1 | 11/2007 | Durand et al. |
| 2007/0288612 A1 | 12/2007 | Hall |
| 2007/0294376 A1 * | 12/2007 | Ayachitula et al. ........... 709/220 |
| 2007/0299951 A1 | 12/2007 | Krithivas |
| 2008/0028048 A1 | 1/2008 | Shekar CS et al. |
| 2008/0040452 A1 | 2/2008 | Rao et al. |
| 2008/0046708 A1 | 2/2008 | Fitzgerald et al. |
| 2008/0059959 A1 | 3/2008 | Chen et al. |
| 2008/0130639 A1 | 6/2008 | Costa-Requena et al. |
| 2008/0189693 A1 | 8/2008 | Pathak |
| 2008/0196043 A1 | 8/2008 | Feinleib et al. |
| 2008/0235266 A1 | 9/2008 | Huang et al. |
| 2008/0235361 A1 | 9/2008 | Crosbie et al. |
| 2008/0244325 A1 | 10/2008 | Tyulenev |
| 2008/0270674 A1 | 10/2008 | Ginzton |
| 2008/0288938 A1 | 11/2008 | DeHaan |
| 2008/0288939 A1 | 11/2008 | DeHaan |
| 2008/0294777 A1 | 11/2008 | Karve et al. |
| 2008/0301666 A1 | 12/2008 | Gordon et al. |
| 2008/0313716 A1 | 12/2008 | Park |
| 2008/0320110 A1 * | 12/2008 | Pathak .......................... 709/220 |
| 2008/0320466 A1 * | 12/2008 | Dias .............................. 717/171 |
| 2009/0007091 A1 | 1/2009 | Appiah et al. |
| 2009/0055901 A1 | 2/2009 | Kumar et al. |
| 2009/0064132 A1 | 3/2009 | Suchy et al. |
| 2009/0089567 A1 | 4/2009 | Boland et al. |
| 2009/0089852 A1 | 4/2009 | Randolph et al. |
| 2009/0106291 A1 | 4/2009 | Ku et al. |
| 2009/0129597 A1 | 5/2009 | Zimmer et al. |
| 2009/0132682 A1 | 5/2009 | Counterman |
| 2009/0132710 A1 | 5/2009 | Pelley |
| 2009/0158148 A1 | 6/2009 | Vellanki et al. |
| 2009/0158272 A1 | 6/2009 | El-Assir et al. |
| 2009/0164522 A1 | 6/2009 | Fahey |
| 2009/0165099 A1 | 6/2009 | Eldar et al. |
| 2009/0172430 A1 | 7/2009 | Takenouchi |
| 2009/0240835 A1 | 9/2009 | Adelman et al. |
| 2009/0259665 A1 | 10/2009 | Howe et al. |
| 2009/0265707 A1 | 10/2009 | Goodman et al. |
| 2009/0282404 A1 | 11/2009 | Khandekar et al. |
| 2009/0285199 A1 | 11/2009 | Strahs et al. |
| 2010/0023740 A1 | 1/2010 | Moon et al. |
| 2010/0100876 A1 | 4/2010 | Glover et al. |
| 2010/0217837 A1 | 8/2010 | Ansari et al. |
| 2010/0220584 A1 | 9/2010 | DeHaan et al. |
| 2010/0223504 A1 | 9/2010 | DeHaan et al. |
| 2010/0223608 A1 | 9/2010 | DeHaan et al. |

(56) References Cited

U.S. PATENT DOCUMENTS

| | | | |
|---|---|---|---|
| 2010/0223609 A1 | 9/2010 | DeHaan et al. | |
| 2010/0287363 A1* | 11/2010 | Thorsen | G06F 21/575 713/2 |
| 2013/0117766 A1* | 5/2013 | Bax | G06F 13/14 719/323 |

OTHER PUBLICATIONS

DeHaan, "Systems and Methods for Retiring Target Machines by a Provisioning Server", U.S. Appl. No. 12/475,427, filed May 29, 2009.

DeHaan, "Methods and Systems for Centrally Managing Multiple Provisioning Servers", U.S. Appl. No. 12/201,193, filed Aug. 29, 2008.

DeHaan, "Methods and Systems for Assigning Provisioning Servers in a Software Provisioning Environment", U.S. Appl. No. 12/201,646, filed Aug. 29, 2008.

DeHaan, "Methods and Systems for Providing Remote Software Provisioning to Machines", U.S. Appl. No. 12/195,633, filed Aug. 21, 2008.

DeHaan, "Systems and Methods for Storage Allocation in Provisioning of Virtual Machines", U.S. Appl. No. 12/202,178, filed Aug. 29, 2008.

DeHaan, "Methods and Systems for Providing Customized Actions Related to Software Provisioning", U.S. Appl. No. 12/200,552, filed Aug. 28, 2008.

DeHaan, "Methods and Systems for Automatically Locating a Provisioning Server", U.S. Appl. No. 12/198,290, filed Aug. 26, 2008.

DeHaan, "Methods and Systems for Managing Access in a Software Provisioning Environment", U.S. Appl. No. 12/201,832, filed Aug. 29, 2008.

DeHaan, "Methods and Systems for Importing Software Distributions in a Software Provisioning Environment", U.S. Appl. No. 12/200,631, filed Aug. 28, 2008.

DeHaan et al., "Methods and Systems for Managing Network Connections Associated with Provisioning Objects in a Software Provisioning Environment", U.S. Appl. No. 12/239,690, filed Sep. 26, 2008.

DeHaan, "Methods and Systems for Monitoring Software Provisioning", U.S. Appl. No. 12/198,378, filed Aug. 26, 2008.

DeHaan, "Systems and Methods for Software Provisioning in Multiple Network Configuration Environment", U.S. Appl. No. 12/202,194, filed Aug. 29, 2008.

DeHaan, "Systems and Methods for Differential Software Provisioning on Virtual Machines Having Different Configurations", U.S. Appl. No. 12/202,019, filed Aug. 29, 2008.

DeHaan, "Methods and Systems for Automatically Registering New Machines in a Software Provisioning Environment", U.S. Appl. No. 12/194,754, filed Aug. 20, 2008.

DeHaan, "Systems and Methods for Software Provisioning Machines Having Virtual Storage Resources", U.S. Appl. No. 12/202,189, filed Aug. 29, 2008.

DeHaan et al., "Methods and Systems for Managing Network Connections in a Software Provisioning Environment", U.S. Appl. No. 12/239,681, filed Sep. 26, 2008.

DeHaan et al., "Methods and Systems for Providing a Rescue Environment in a Software Provisioning Environment", U.S. Appl. No. 12/325,007, filed Nov. 28, 2008.

DeHaan et al., "Systems and Methods for Monitoring Hardware Resource in a Software Provisioning Environment", U.S. Appl. No. 12/325,056, filed Nov. 28, 2008.

DeHaan, "Methods and Systems for Providing Power Management Services in a Software Provisioning Environment", U.S. Appl. No. 12/277,518, filed Nov. 25, 2008.

DeHaan et al., "Methods and Systems for Providing Hardware Updates in a Software Provisioning Environment", U.S. Appl. No. 12/324,991, filed Nov. 28, 2008.

DeHaan et al., "Methods and Systems for Supporting Multiple Name Servers in a Software Provisioning Environment", U.S. Appl. No. 12/324,572, filed Nov. 26, 2008.

DeHaan et al., "Methods and Systems for Secure Gated File Deployment Associated with Provisioning", U.S. Appl. No. 12/393,754, filed Feb. 26, 2009.

DeHaan, "Systems and Methods for Integrating Software Provisioning and Configuration Management", U.S. Appl. No. 12/395,379, filed Feb. 27, 2009.

DeHaan, Systems and Methods for Abstracting Software Content Management in a Software Provisioning Environment, U.S. Appl. No. 12/395,273, filed Feb. 27, 2009.

DeHaan et al., "Systems and Methods for Providing a Library of Virtual Images in a Software Provisioning Environment", U.S. Appl. No. 12/395,351, filed Feb. 27, 2009.

DeHaan et al., "Systems and Methods for Inventorying Un-Provisioned Systems in a Software Provisioning Environment", U.S. Appl. No. 12/391,588, filed Feb. 24, 2009.

DeHaan et al., "Systems and Methods for Managing Configurations of Storage Devices in a Software Provisioning Environment", U.S. Appl. No. 12/393,613, filed Feb. 26, 2009.

DeHaan et al., "Systems and Methods for Collecting and Altering Firmware Configurations of Target Machines in a Software Provisioning Environment", U.S. Appl. No. 12/393,319, filed Feb. 26, 2009.

DeHaan et al., "Methods and Systems for Replicating Provisioning Servers in a Software Provisioning Environment", U.S. Appl. No. 12/392,508, filed Feb. 25, 2009.

DeHaan, "Methods and Systems for Provisioning Software", U.S. Appl. No. 11/763,316, filed Jun. 14, 2007.

DeHaan, "Methods and Systems for Provisioning Software", U.S. Appl. No. 11/763,333, filed Jun. 14, 2007.

Doc Searls "Linux for Suits", 2005, Specialized System Consultants Inc., vol. 2005.

eBook "Microsoft System Management Server 2003 Administrator's companion", Microsoft Press, c2004, Ch. 13, Patch Management, pp. 471-507.

Butt et al., "Automated Installation of Large-Scale Linux Networks", 2000.

Agarwalla, "Automating Provisioning of Complete Software Stack in a Grid Environment", 2004.

Anderson et al., "Technologies for Large-Scale Configuration Management", Dec. 9, 2002.

Grosse, "Repository Mirroring", 1995.

DeHaan, "Systems and Methods for Message-Based Installation Management Using Message Bus", U.S. Appl. No. 12/495,077, filed Jun. 30, 2009.

Henson, "Systems and Methods for Integrating Storage Resources from Storage Area Network in Machine Provisioning Platform", U.S. Appl. No. 12/628,041, filed Nov. 30, 2009.

Henson, "Systems and Methods for Mounting Specified Storage Resources from Storage Area Network in Machine Provisioning Platform", U.S. Appl. No. 12/627,968, filed Nov. 30, 2009.

HP Storage Essentials SRM 6.0 installation Guide. Jan. 2008. HP. 1st ed. Part No. T4283-96113. pp. 1-5, 97-136, 219-228.

HP Storage Essentials SRM 6.0 User Guide. Jan. 2008. HP. 1st ed. Part No. T4238-96114. pp. 1-83.

Michael DeHaan. "Unfiled Provisioning". 2007.

Michael DeHaan. "Provisioning With Cobbler". 2007.

Tan et al. "A WBEM Basked Disk Array Management Provider". 2005. IEEE. 2005 International Conference on Cyberworlds.

Lovelace et al. Managing Disk Subsystems using IBM TotalStorage Productivity Center. Sep. 2005. IBM. 2nd ed. SG24-7097-01. pp. 1-42.

"Systems and Methods for Remote Management of Networked Systems Using Secure Modular Platform", U.S. Appl. No. 12/130,424, filed May 30, 2008, by DeHaan et al.

* cited by examiner

CLONING TARGET MACHINES IN A SOFTWARE PROVISIONING ENVIRONMENT

FIELD

This invention relates generally to software provisioning.

DESCRIPTION OF THE RELATED ART

Software provisioning is the process of selecting a target machine, such as a server, loading the appropriate software (operating system, device drivers, middleware, and applications), and customizing and configuring the system and the software to make it ready for operation. Software provisioning can entail a variety of tasks, such as creating or changing a boot image, specifying parameters, e.g. IP address, IP gateway, to find associated network and storage resources, and then starting the machine and its newly-loaded software. Typically, a system administrator will perform these tasks using various tools because of the complexity of these tasks. Unfortunately, there is a lack of provisioning control tools that can adequately integrate and automate these tasks.

In software provisioning, the administrator may desire to duplicate a machine in the network. For example, the original machine may be performing a process which the administrator desires to repeat or the original machine may be performing well and the administrator desires to recreate the properly functioning machine. The administrator, however, must rebuild the original machine and re-provision the software to the new machine.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments of the present teachings relate to systems and methods for cloning target machines in a software provisioning environment. More particularly, a provisioning server can utilize a cloner agent on target machines to copy the installation of one target machine to other target machines.

According to embodiments, a provisioning server can be configured to provide and to interact with a cloner agent on target machines. The cloner agent can be configured to execute on a source target machine and to copy the contents of storage on the source target machine to a storage location of the provisioning server. In particular, the cloner agent can be configured to copy the file system, partition by partition and/or disk by disk, of the source target machine to the provisioning server, thereby creating an exact copy of the source target machine. Once copied, the provisioning server can be configured to provide the cloner agent to destination target machines. The cloner agent can be configured to copy the contents of the source target machine stored at the provisioning server to the destination target machines. In particular, the provisioning server can be configured to copy the file system, partition by partition and/or disk by disk, stored at the provisioning server to the destination target machines in order create an exact copy of the source target machine on the destination target machines.

According to embodiments, to provide the cloner agent, the provisioning server can be configured to instruct a network management server to provide a command to a helper client on the target machines. The command can be configured to cause the helper client to retrieve the cloner agent from the provisioning server. Additionally, the provisioning server can be configured to instruct the helper client, directly. Likewise, the provisioning server can be configured to transmit the cloner agent to the target machines and to instruct the target machines to alter their power state (e.g. power cycle), if necessary, to provide and to initiate the cloner agent.

By utilizing the cloner agent, the provisioning server can create an exact copy of a target machine as it exists in the software provisioning environment. As such, the provisioning server can replicate a target machine without rebuilding the target machine and provisioning the software to new target machines. Additionally, because the replicated target machine is an exact copy in production, the provisioning server can create new target machines that are known to operate properly without having to reconfigure or update the new target machines.

Figure 1:
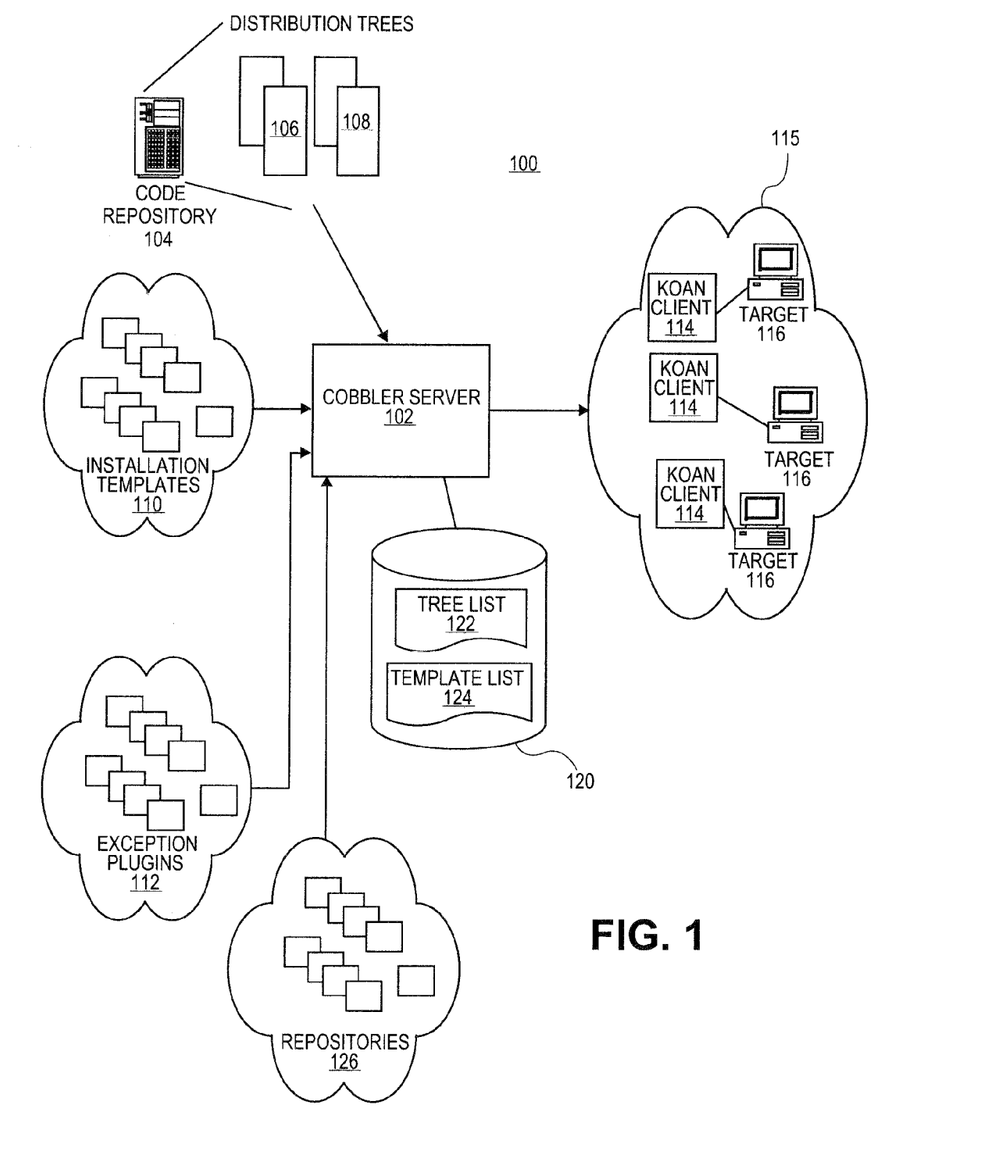
FIG. 1 illustrates an overall provisioning environment in which various embodiments of the present teachings can be practiced.

FIG. 1 illustrates an overall provisioning environment 100, in systems and methods for the execution, management, and monitoring of software provisioning, according to exemplary aspects of the present disclosure. Embodiments described herein can be implemented in or supported by the exemplary environment illustrated in FIG. 1. The provisioning environment 100 provides a unified provisioning environment, which comprehensively manages the tasks related to software provisioning.

In particular, the provisioning environment 100 can manage software provisioning using a hierarchy of commands. In exemplary embodiments, the hierarchy can include at least four levels of commands. The lowest level in the hierarchy can comprise distribution commands, which primarily handle base operating system specific tasks of provisioning. The second level can comprise profile commands, which associate a configuration file, such as a kickstart file for Linux or other operating system, with a distribution and optionally allow for customization. The third level comprises system commands, which associate remote systems that are involved with the provisioning of the software. The fourth level comprises repository commands, which address configurations and tasks related to updating the software, remote installation procedures, and optionally customizing the software.

The provisioning environment 100 provides several capabilities and advantages over the known provisioning solutions. For example, the present invention is capable of handling a variety of forms of installations, such as preboot execution environment ("PXE"), virtualization, re-installations, and image installations.

In exemplary aspects, the provisioning environment 100 enables integrating virtualization into a PXE provisioning infrastructure and provides several options to reinstall running machines as well. The provisioning environment 100 can integrate mirroring of package repositories with the provisioning process, so that a provisioning server may serve as a central mirror point of contact for all of an organization's software needs. In aspects, a set of remote mirrored repositories can automatically be used by provisioned systems without additional setup.

Reference will now be made in detail to the exemplary aspects the provisioning environment 100. The provisioning environment 100 can be applied to provisioning any form of software, such as Windows systems, UNIX systems, and Linux systems. In the exemplary description that follows, FIG. 1 is presented to explain the provisioning environment 100 for provisioning software, such as Linux, and Linux based software, such as Fedora and Red Hat Enterprise Linux by Red Hat, Inc.

In provisioning of software such as Linux, many system administrators use what is known as the "kickstart" installation method. Kickstart files are files that specify the intended configuration of the software being provisioned. Kickstart files can be kept on a server and can be read by individual computers during the installation. This installation method allows the use of a single or relatively few standard kickstart files to install Linux on multiple machines, making it ideal for network and system administrators.

The kickstart file can be a simple text file, containing a list of items, each identified by a keyword. In general, a kickstart file can be edited with any text editor or word processor that can save files as ASCII text. One skilled in the art will recognize that the present invention may be applied to non-kickstart files in software provisioning. For example, configuration files such as AutoYAST Answer files used in Novell SuSe Linux and Sun Solaris Jumpstart files may also be used by the provisioning environment 100.

Typically, a kickstart file can be copied to the boot disk, or made available on the network. The network-based approach is most commonly used, as most kickstart installations for software provisioning, such as Linux systems, tend to be performed via a network using NFS, FTP, or HTTP on networked computers. Administrators also find it desirable that kickstart installations can be performed using a local CD-ROM, or a local hard drive.

Using kickstart files, a system administrator can create a single file containing the parameters that are needed to complete a typical software installation. For example, kickstart files specify parameters related to: language selection; mouse configuration; keyboard selection; boot loader installation; disk partitioning; network configuration; NIS, LDAP, Kerberos, Hesiod, and Samba authentication; firewall configuration; and package selection.

According to exemplary aspects illustrated in FIG. 1, the provisioning environment 100 can include a provisioning server 102, a code repository 104 which provides access to distributions 106 and 108, a set of installation templates 110, a set of exception plugins 112, a helper client 114 running on target machines 116 in a network 115, a provisioning database 120 which comprises a distribution tree list 122 and template list 124. Each of these components will now be firmer described.

The provisioning server (from herein referred to as a "cobbler") 102 is responsible for: serving as an extensible markup language remote procedure call (XMLRPC) handler; linking to or mirroring install distribution trees and a configuration database; hosting kickstart templates; hosting plugins; generating installation images, and the like. The cobbler server 102 can be implemented as software, such as Python code, installed on a boot server machine and provide a command line interface for configuration of the boot server. In addition, the cobbler server 102 can make itself available as a Python application programming interface (API) for use by higher level management software (not shown). The cobbler server 102 supports provisioning via PXE, image (ISO) installation, virtualization, re-provisioning. As will be described later, the last two modes are performed with the assistance of a helper client 114.

The code repository 104 is responsible for hosting distributions 106 and 108. The code repository 104 can be implemented using well known components of hardware and software. Additionally, the code repository 104 can include one or more repositories hosting distributions. The distributions 106 and 108 can include bundles of software that are already compiled and configured. The distributions 106 and 108 may be in the form of either rpm, deb, tgz, msi, exe formats, and the like. For example, as Linux distributions, the distributions 106 and 108 are bundles of software that comprise the Linux kernel, the non-kernel parts of the operating system, and assorted other software. The distributions 106 and 108 can take a variety of forms, from fully-featured desktop and server operating systems to minimal environments.

In exemplary aspects, the installation templates 110 are any data structure or processing element that can be combined with a set of installation configurations and processed to produce a resulting configuration file, such as a kickstart file.

In exemplary aspects, exception plugins 112 are software that interact with cobbler server 102 to customize the provisioning of software. In general, the exception plugins 112 are intended to address infrequent customization needs.

In exemplary aspects, the helper client (known as "koan", which stands for "kickstart-over-a-network") 114 can assist the cobbler server 102 during the provisioning processes. The koan 114 can allow for both network provisioning of new virtualized guests and destructive provisioning of any existing system. When invoked, the koan 114 can request profile information from a remote boot server that has been configured with the cobbler server 102. In some aspects, what the koan 114 does with the profile data depends on whether it was invoked with—virt or—replace-self.

In exemplary aspects, the koan 114 can enable replacing running systems as well as installing virtualized profiles. The koan 114 can also be pushed out to systems automatically from the boot server. In some aspects, the koan client 114 is also written in Python code to accommodate a variety of operating systems, machine architectures, etc.

In exemplary aspects, the network 115 can include a number of the target machines 116. The target machines 116 can represent the particular machines to which software provisioning is directed. The target machines 116 can represent a wide variety of computing devices, such as personal computers, servers, laptop computers, personal mobile devices, and the like. In some aspects, the target machines 116 can represent distributed computing environments such as cloud computing environments. Although FIG. 1 shows several of the target machines 116, the provisioning environment 100 can be capable of managing a wide range environments, such as datacenters with thousands of machines or server pools with just a few machines. Additionally, the cobbler server 102 can be connected to multiple networks 115.

In exemplary aspects, the provisioning database 120 can serve as a data storage location for holding data used by the cobbler server 102. For example, as shown, the provisioning database 120 can comprise the distribution tree list 122 and the template list 124. The distribution tree list 122 can provide an inventory of the distributions 106 and 108 that are hosted or mirrored by the cobbler server 102. The template list 124 can provide an inventory of the templates 110 that are hosted by the cobbler server 102.

As noted above, the cobbler server 102 can manage provisioning using a hierarchical concept of distribution commands, profile commands, system commands, and repository commands. This framework enables the cobbler server 102 to abstract the differences between multiple provisioning types (installation, reinstallation, and virtualization) and allows installation of all three from a common platform. This hierarchy of commands also permits the cobbler server 102 to integrate software repositories 126 with the provisioning process, thus allowing systems to be configured as a mirror for software updates and third party content as well as distribution content.

Distributions can contain information about base operating system tasks, such as what kernel and initial ramdisk ("initrd") are used in the provisioning, along with other information, such as required kernel parameters. Profiles associate one of the distributions 106 and 108 with a kickstart file and optionally customize it further, for example, using plugins 112. System commands associate a hostname, IP, or (machine access control) MAC with a distribution and optionally customize the profile fiber. Repositories contain update information, such as yum mirror information that the cobbler server 102 uses to mirror repository 104. The cobbler server 102 can also manage (generate) dynamic host configuration protocol (DHCP) configuration files using the templates 110.

In exemplary aspects, the cobbler server 102 can use a provisioning environment that is fully templated, allowing for kickstarts and PXE files to be customized by the user. The cobbler server 102 uses the concept of "profiles" as an intermediate step between the operating system and the installed system. A profile is a description of what a system does rather than the software to be installed. For instance, a profile might describe a virtual web server with X amount of RAM, Y amount of disk space, running a Linux distribution Z, and with an answer file W.

In exemplary aspects, the cobbler server 102 can provide a command line interface to configure a boot server in which it is installed. For example, the format of the cobbler server 102 commands can be generally in the format of: cobbler command [subcommand] [--arg1=] [--arg2=]. Thus, a user can specify various aspects of software provisioning via a single interface, such as a command line interface or other known interface. Examples of exemplary cobbler commands can be found in U.S. patent application Ser. No. 11/763,315, U.S. Patent Application Publication No. 2008-0288938 and U.S. patent application Ser. No. 11/763,333, U.S. Patent Publication No. 2008-0288939, all assigned to Red Hat Corporation, the disclosures of which are incorporated herein, in their entirety, by reference.

According to exemplary aspects, a user can use various commands of the provisioning environment 100 to specify distributions and install trees hosted by the code repository 104, such as a distribution from the distributions 106 or 108.

A user can add or import a distribution or import it from installation media or an external network location.

According to exemplary aspects, in order to import a distribution, the cobbler server 102 can auto-add distributions and profiles from remote sources, whether this is an installation media (such as a DVD), an NFS path, or an rsync mirror. When importing an rsync mirror, the cobbler server 102 can try to detect the distribution type and automatically assign kickstarts. By default in some embodiments, the cobbler server can provision by erasing the hard drive, setting up eth0 for DHCP, and using a default password. If this is undesirable, an administrator may edit the kickstart files in /etc/cobbler to do something else or change the kickstart setting after the cobbler server 102 creates the profile.

According to exemplary aspects, a user may map profiles to the distributions and map systems to the profiles using profile commands and systems commands of the provisioning environment 100. A profile associates a distribution to additional specialized options, such as a kickstart automation file. In the cobbler server 102, profiles are the unit of provisioning and at least one profile exists for every distribution to be provisioned. A profile might represent, for instance, a web server or desktop configuration.

According to exemplary aspects, a user can map systems to profiles using system commands. System commands can assign a piece of hardware with cobbler server 102 to a profile. Systems can be defined by hostname, Internet Protocol (IP) address, or machine access control (MAC) address. When available, use of the MAC address to assign systems can be preferred.

According to exemplary aspects, the user can map repositories and profiles using repository commands. Repository commands can address configurations and tasks related to updating the software, remote installation procedures, and optionally customizing the software. These repository commands can also specify mirroring of the provisioned software to remote servers. Repository mirroring can allow the cobbler server 102 to mirror not only the trees 106 and 108, but also optional packages, third party content, and updates. Mirroring can be useful for faster, more up-to-date installations and faster updates, or providing software on restricted networks. The cobbler server 102 can also include other administrative features, such as allowing the user to view their provisioning configuration or information tracking the status of a requested software installation.

According to exemplary aspects, a user can utilize commands to create a provisioning infrastructure from a distribution mirror. Then a default PXE configuration is created, so that by default, systems will PXE boot into a fully automated install process for that distribution. The distribution mirror can be a network rsync mirror or a mounted DVD location.

According to exemplary aspects, the administrator uses a local kernel and initrd file (already downloaded), and shows how profiles would be created using two different kickstarts—one for a web server configuration and one for a database server. Then, a machine can be assigned to each profile.

According to exemplary aspects, a repo mirror can be set up for two repositories, and create a profile that will auto install those repository configurations on provisioned systems using that profile.

According to exemplary aspects, in addition to normal provisioning, the cobbler server 102 can support yet another option, called "enchant". Enchant takes a configuration that has already been defined and applies it to a remote system that might not have the remote helper program installed. Users can use this command to replace a server that is being repurposed, or when no PXE environment can be created. Thus, the enchant option allows the koan client 114 to be executed remotely from the cobbler server 102.

According to aspects, if the cobbler server 102 is configured to mirror certain repositories, the cobbler server 102 can then be used to associate profiles with those repositories. Systems installed under those profiles can be auto configured to use these repository mirrors in commands and, if supported, these repositories can be leveraged. This can be useful for a large install base, when fast installation and upgrades for systems are desired, or software not in a standard repository exists and provisioned systems desire to know about that repository.

According to exemplary aspects, the cobbler server 102 can also keep track of the status of kicks ting machines. For example, the "cobbler status" will show when the cobbler server 102 thinks a machine started kickstarting and when it last requested a file. This can be a desirable way to track machines that may have gone inactive during kickstarts. The cobbler server 102 can also make a special request in the post section of the kickstart to signal when a machine is finished kickstarting.

According to exemplary aspects, for certain commands, the cobbler server 102 will create new virtualized guests on a machine in accordance with orders from the cobbler server 102. Once finished, an administrator can use additional commands on the guest or other operations. The cobbler server 102 can automatically name domains based on their MAC addresses. For re-kickstarting, the cobbler server 102 can reprovision the system, deleting any current data and replacing it with the results of a network install.

According to exemplary aspects, the cobbler server 102 can configure boot methods for the provisioning requested by the user. For example, the cobbler server 102 can configure a PXE environment, such as a network card BIOS. Alternatively, the cobbler server 102 can compile and configure information for koan client 104. The cobbler server 102 can also optionally configure DHCP and DNS configuration information.

According to exemplary aspects, the cobbler server 102 can serve the request of the koan client 114. The koan client 114 can acknowledge the service of information of the cobbler server 102 and can then initiate installation of the software being provisioned. Additionally, the koan client 114 can either install the requested software, e.g., replace the existing operating system, or install a virtual machine.

Figure 2:
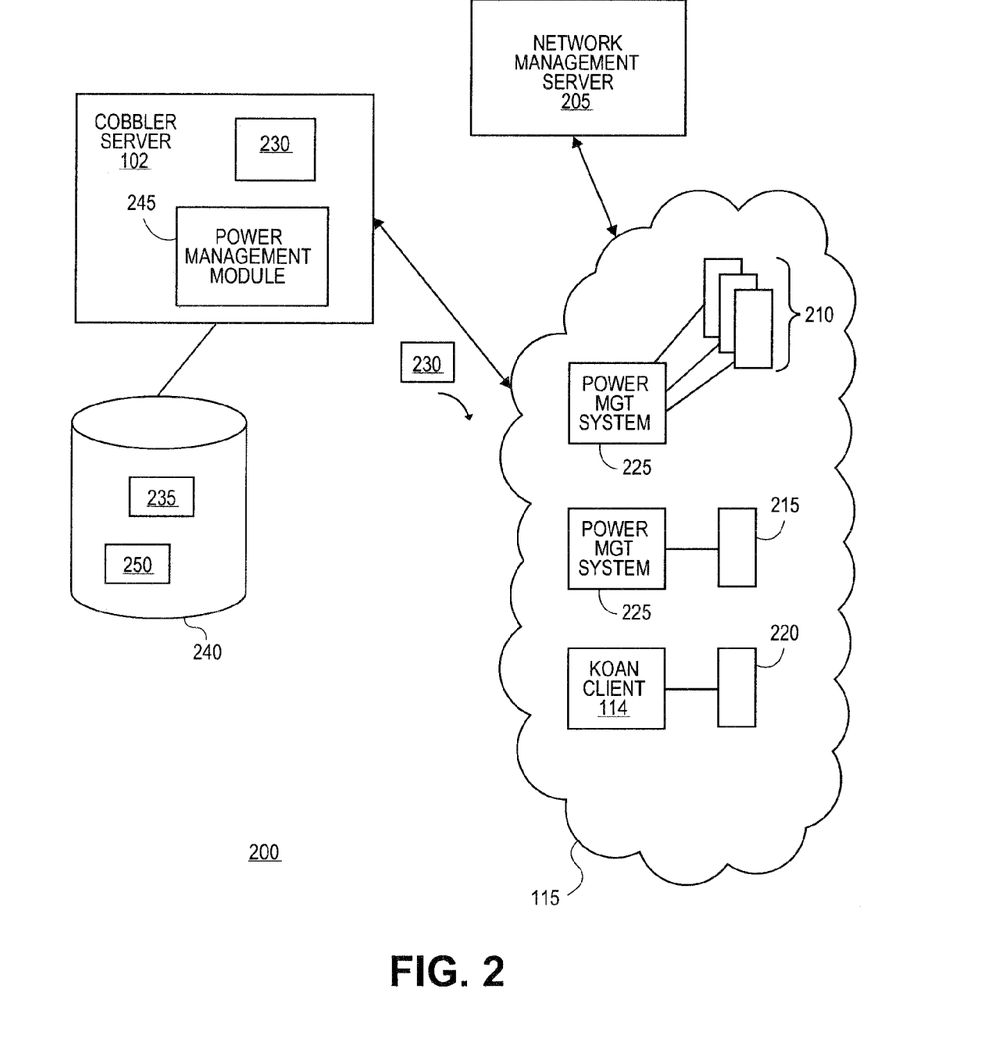
FIG. 2 illustrates the overall provisioning environment in which a provisioning server can clone target machines, according to various embodiments.

FIG. 2 illustrates aspects of the provisioning environment 200 that allows for cloning of target machines, remotely. In embodiments as shown, the cobbler server 102 can be coupled to a network 115 and a network management server 205 to provide provisioning processes and other actions related to provisioning for the network 115. While FIG. 2 illustrates one network 115 with exemplary components, one skilled in the art will realize that the cobbler server 102 can be coupled to multiple networks to provide provisioning processes and other actions related to provisioning.

As shown in FIG. 2, the network 115 can include a number of target machines 210, 215, and 220. For example, the target machines 210 can include a set of target machines such as a group of server computers, such as blade servers. The target machines 215 and 220 can include computing systems such as servers, personal computers, laptop computers, etc. Any of the target machines 210, 215, and 220, for example the target machines 210 and 215, can be connected to power management systems 225 to control the power supplied to the target machines 210, 215, and 220 and to alter the power state of one or more of the target machines 210, 215, and 220 (e.g. power cycle). The power management systems 225 can be any type of system to manage the power of the target machines, for example, Integrated Lights Out (ILO) by Hewlett Packard™ Corporation, Dell™ Remote Access Control (DRAC) by Dell Corporation, WTI powerbar by Western Telematics, Inc, and other power system supporting network communications. Additionally, each of the target machines 210, 215, and 220, for example the target machine 220, can be configured to include the koan client 114.

In embodiments, the target machines 210, 215, and 220 can include hardware typically found in conventional computing system (processors, memory, video cards, network interface cards, storage devices, and the like). Additionally, each of the target machines 210, 215, and 220 can be installed with different types of software (OS, application programs, and the like) to perform different functions. For example, the target machine 215 can include software that cause the target machines 215 to operate as a server computing system to provide services (application server, database server, etc) to other computing systems, and the target machine 220 can include software that causes the target machine 220 to operate as a user or client computer.

In embodiments, the administrator of the network 115 can desire to create an exact copy of one of the target machines 210, 215, and 220 on another target machine. For example, a particular target machine can be operating properly in the network 115 and providing a particular service to the network. The administrator may desire to create another target machine that offers the same service and operates in a manner similar to the particular target machine. Because the particular target machine is already operating properly in the network 115, the administrator can desire to exactly replicate the particular target machine. For instance, the software installed on the particular target machine may have been updated or configured over time to operate properly on the network 115.

In embodiments, the cobbler server 102 can be configured to replicate one or more of the target machines 210, 215, and 220. To achieve this, the cobbler server 102 can be configured to provide a cloner agent 230 to one of the target machines 210, 215, and 220 (source target machine) and to interact with the cloner agent 230 to copy contents of the computer readable storage devices or media of the source target machine. In particular, the cloner agent 230 can be configured to copy the file system, partition by partition and/or disk by disk, of the source target machine to a storage space 235 on a computer readable storage device or medium 240 associated with the cobbler server 102. As such, the cloner agent 230 can create an exact copy of storage contents of the source target machine as it exists in the network 115. As such, the exact copy would represent a snap-shot of the installed software on the source target machine as it exists in the network 115.

In embodiments, to re-create one of the target machines 210, 215, and 220, the cobbler server 102 can be configured to provide the cloner agent 230 to one or more of the target machines 210, 215, and 220 ("destination target machines") and to interact with the cloner agent 230 to render an exact copy of the storage contents of the source target machine from the storage space 235 to the destination target machines. As such, the cobbler server 102 can create an exact copy of the source target machine on the destination target machines.

In embodiments, the cloner agent 230 can be configured to include the necessary logic, routines, instruction, and commands to boot the source target machine and to cooperate with the OS of the source target machine in order to copy the contents of the file system of the source target machine to the storage space 235. Likewise, the cloner agent 230 can be configured to include the necessary logic, routines, instruction, and commands to boot the destination target machine and to cooperate with the OS of the destination target machine in order to copy the contents of the storage space 235 to the destination target machine in order to create a copy of the source target machine. The cloner agent 230 can be, for example, a disk image, an ISO image, a software appliance (e.g. portions of an OS and applications), operating system image (OS kernal and/or initrd), or any other type of tailored software application capable of executing on the target machines 210, 215, and 220.

In embodiments, the cobbler server 102 can initiate utilizing the cloner agent 230 upon the occurrence of any number of events. For example, the cobbler server 102 can replicate a source target machine on a destination target machine in order to increase the number of target machines providing the service of the source target machine. Additionally, a new target machine can be added to the network 115, and the cobbler server 102 can replicate the source target machine to the new target machine. Further, the cobbler server 102 can have previously replicated a source target machine and can maintain the exact copy of the source target machine in the storage space 235. Subsequently, the source target machine may experience an error (hardware failure, software failure, intruder attack, data corruption, etc.), and the cobbler server 102 can utilize the exact copy to restore the source target machine.

In embodiments, the cobbler server 102 can be configured to maintain the cloner agent 230 for access and utilization in cloning the target machines 210, 215, and 220. For example, the cobbler server 102 can be configured maintain the cloner agent 230 in a computer readable storage medium, for example computer readable storage medium 240, whether local to the cobbler server 102 or remotely located.

In embodiments, to clone the target machines 210, 215, and 220, the cobbler server 102 can be configured to utilize a variety of methods to provide the cloner agent 230 to the target machines 210, 215, and 220. For example, to provide the cloner agent 230, the cobbler server 102 can be configured to provide the cloner agent 230 utilizing the network management server 205 and the koan client 114. For example, the cobbler server 102 can be configured to instruct the network management server 205 to provide a command to the koan client 114 on the target machines 220. The command can be configured to cause the koan client 114 to retrieve the cloner agent 230 from the cobbler server 102 and initiate the cloner agent 230 on the target machines 2220. Likewise, the cobbler server 102 can be configured to directly instruct the koan client 114 to retrieve the cloner agent 230 and to initiate the cloner agent 230.

In embodiments, the network management server 205 can be any type of network management application or tool to securely communicate with the target machines 210, 215, and 220, to monitor the state of the target machines 210, 215, and 220, to retrieve and request data from the target machines 210, 215, and 220, and to manage and direct the target machines 210, 215, and 220. For example, the network management server 205 can be a "FUNC" server as described in U.S. patent application Ser. No. 12/130,424, filed May 30, 2008, entitled "SYSTEMS AND METHODS FOR REMOTE MANAGEMENT OF NETWORKED SYSTEMS USING SECURE MODULAR PLATFORM" (U.S. Patent Application Publication No. 2009-0300180) assigned to Red Hat Corporation, the disclosure of which is incorporated herein, in its entirety, by reference.

In embodiments, the cobbler server 102 can be configured to provide the cloner agent 230 to the target machines 210, 215, and 220, directly. For example, the cobbler server 102 can be configured to transmit the cloner agent 230 to the target machines 205 utilizing any type of network processes, for example, PXE.

In embodiments, in order to provide and/or to execute the cloner agent 230, the cobbler server 102 can be configured to instruct the target machines 205 to alter their power state (e.g. power cycle), if necessary. For example, in order to provide the cloner agent 230, the target machines 210, 215, and 220 may need to be power cycled in order to initiate the network transfer of the cloner agent 230. Likewise, the cobbler server 102 can power cycle (power down/power up) the target machines 210, 215, and 220 in order to initiate the cloner agent 230 or restart the target machines 210, 215, 220 after the cloner agent 230 has completed copying. The cobbler server 102 can be configured to communicate with the power management system 225 of the target machines 210, 215, and 220 to alter the power state of the target machines 210, 215, and 220. To achieve this, the cobbler server 102 can be configured to include a power management module 245.

In embodiments, the power management module 245 can be configured to communicate with the power management systems 225 of the target machines 210, 215, and 220. The power management module 245 can be configured to instruct the power management systems 225 to alter the power state of the target machines 210, 215, and 220. The power management module 245 can be configured to generate a command or instruction. The instruction can include access information for the power management systems 225 and the power state alteration to be performed.

In embodiments, the power management module 245 can be configured to form the instruction in a protocol utilized by the particular power management systems 225. For example, the cobbler server 102 can be configured to utilize conventional or proprietary protocols or tools such as IPMI, DRAC, ILO, fence agents and the like. The power management module 245 can be configured to utilize a pre-determined protocol or utilize several protocols in order to determine the appropriate protocol. Once generated, the cobbler server 102 can be configured to transmit the instruction to the determined power management systems 225.

In embodiments, the power management module 245 can be implemented as a portion of the code for the cobbler server 102. Likewise, the power management module 245 can be implemented as a separate software tool accessible by the cobbler server 102. Additionally, the power management module 245 can be implemented as a portion of the code for the network management server 205. The power management module 245 can be written in a variety of programming languages, such as JAVA, C++, Python code, and the like to accommodate a variety of operating systems, machine architectures, etc. Additionally, the power management module 245 can be configured to include the appropriate application programming interfaces (APIs) to communicate with and cooperate with other components of the cobbler server 102.

In one example, the cobbler server 102 can initiate replicating the target machine 215 to the set of target machines 210. For instance, the target machine 215 can be operating as an application server and the administrator of the network 115 can desire to extend these services by adding additional application servers. To begin the replication, the cobbler server 102 can be configured to specify the location of the storage space 235 in the cloner agent 230. Then, the cobbler server 102 can provide the cloner agent 230 to the target machine 215. For example, the cobbler server 102 can transfer the cloner agent 230 by a network protocol, such as PXE. Likewise, the cobbler server 102 can utilize the network management server 205 and/or a koan client to provide the cloner agent 230.

In this example, once the cloner agent 230 is transferred, the cobbler server 102 can instruct the power management system 225 to power cycle the target machine 215, again, to initiate the cloner agent 230. Likewise, the cobbler server 102 can instruct the network management server 205 and/or the koan client 114 to power cycle the target machine 215. Once initiated, the cloner agent 230 can copy the contents of the storage devices and media of the target machine 215 to the storage space 235. For instance, the cloner agent 230 can copy the file system, partition by partition and/or disk by disk, to the storage space 235. After copying is completed, the cobbler server 102 can remove the cloner agent 230, and the cobbler server 102 can, again, instruct the power management system 225 to power cycle the target machine 215 in order to place the target machine 215 back into normal operation.

In this example, the cobbler server 102 can then provide the cloner agent 230 to the set of target machines 210. For example, the cobbler server 102 can transfer the cloner agent 230 by a network protocol, such as PXE. Likewise, the cobbler server 102 can utilize the network management server 205 and/or a koan client 114 to provide the cloner agent 230 to the set of target machines 210.

In this example, once the cloner agent 230 is transferred, the cobbler server 102 can instruct the power management system 225 to power cycle the set of target machines 210, again, to initiate the cloner agent 230. Likewise, the cobbler server 102 can instruct the network management server 205 and/or the koan client 114 to power cycle the target machine 210. Once initiated, the cloner agent 230 can copy the contents of the storage space 235 to the storage devices and media of the set of target machines 210. For instance, the cloner agent 230 can copy the file system, partition by partition and/or disk by disk, from the storage space 235 to the set of target machines 210. After copying is completed, the cobbler server 102 can remove the cloner agent 230 and the cobbler server 102 can, again, instruct the power management system 225 to power cycle the set of target machines 210 in order to start the set of target machines 210 as clones of the target machine 215.

In embodiments, the cobbler server 102 can be configured to maintain an inventory 250 of the target machines 210, 215, and 220 in the network 115. The inventory can include information that describes the target machines such as hardware, software provisioned, provisioning objects associated with the target machine, configurations, the power managements systems 225, etc. associated with data that uniquely identifies the target machines 210, 215, 220 in the network 115 such as Media Access Control ("MAC") address, Ethernet Hardware Address ("EHA"), and the like. When performing the cloning as described above, the cobbler server 102 can be configured to utilize the inventory to identify target machines 210, 215, and 220 and communicate with the target machines 210, 215, and 220. Likewise, once a target machine is cloned, the cobbler server 102 can be configured to update the inventory 250 to reflect the cloned target machines. The inventory 250 can be maintained in any location such as provisioning database 120 described in FIG. 1 and can be stored in a computer readable storage medium, such as computer readable storage medium 240.

In embodiments, the cobbler server 102 can be configured to maintain the copies of the storage content in the storage space 235 indefinitely. As such, the cobbler server 102 can clone target machines without having to copy the source target machines again. Likewise, the cobbler server 102 can be configured to associate the copies of the storage content in the storage space 235 with provisioning objects, such as pro-files and templates. As such, the cobbler server 102 can perform cloning based on the provisioning objects.

In embodiments, the provisioning objects can include all the data required by the cobbler server 102 to perform the software provisioning processes, such as the process described above, supported by the cobbler server 102. For example, the provisioning objects can include software distributions; configuration templates (templates for generating configuration files, such as kickstart files); distribution profile information (mapping a distribution to profile; a configuration template or a configuration file, and additional preferences, such as kernel options, template variables, or virtual machine settings); target machine information (information representing the mapping of a physical piece of hardware, plus hardware specific customizations, to a profile that it should run); repos information (information representing external or internal software repositories stored on the cobbler server); images (such as distributions representing an undefined executable image (like "memtest"); a virtual machine to be cloned, or an ISO file for use in installing a virtual machine); and the like.

In embodiments, once a source target machine is replicated to a destination target machine, the cobbler server 102 can configure the destination target machine as required to allow the destination target machine to function properly in the network 115. For example, the cobbler server 102 can perform any of the configuration operations described in FIG. 1, such as establishing network settings for the destination target machine.

Figure 3:
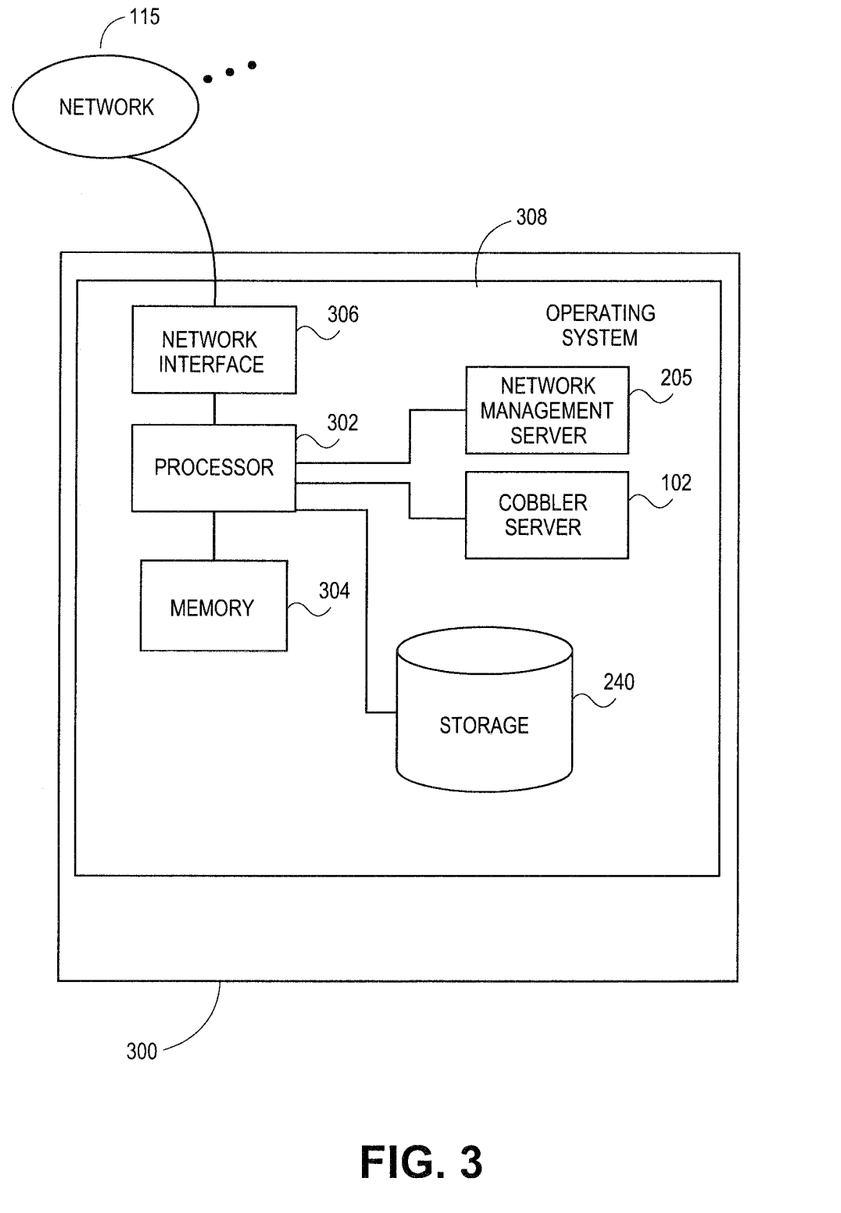
FIG. 3 illustrates an exemplary hardware configuration for a provisioning server, according to various embodiments.

FIG. 3 illustrates an exemplary diagram of hardware and other resources that can be incorporated in a computing system 300 configured to communicate with the network 115, and execute the cobbler server 102 and the network management server 215 according to embodiments. In embodiments as shown, the computing system 300 can comprise a processor 302 communicating with memory 304, such as electronic random access memory, operating under control of or in conjunction with operating system 308. Operating system 308 can be, for example, a distribution of the Linux™ operating system, the Unix™ operating system, or other open-source or proprietary operating system or platform. Processor 302 also communicates with the computer readable storage medium 240, such as hard drives, optical storage, and the like, whether local to or remote from the computing system 300. While illustrated as a local storage in computing system 300, the computer readable storage medium 240 can be separate from the computing system 300, and the cobbler server 102 can be configured to communicate with the remote computer readable storage medium 240.

Processor 302 further communicates with network interface 306, such as an Ethernet or wireless data connection, which in turn communicates with one or more networks 115, such as the Internet or other public or private networks. Processor 302 also communicates with the computer readable storage medium 240, the cobbler server 102, and the network management server 205, to execute control logic and perform the cloning processes described above and below.

As illustrated, the cobbler server 102 can be implemented as a software application or program capable of being executed by a conventional computer platform. Likewise, the cobbler server 102 can also be implemented as a software module or program module capable of being incorporated in other software applications and programs. In either case, the cobbler server 102 can be implemented in any type of conventional proprietary or open-source computer language. When implemented as a software application or program code, the cloud management system 102 can be stored in a computer readable storage medium, such as the computer readable storage medium 240, accessible by the computing system 300.

As illustrated, the network management server 205 can be executed in the computing system 300. Likewise, the network management server 205 can be executed in a separate computing system including components similar to computing system 300. Accordingly, the computing system 300 can communicate with the network management server 205 via the network interface 306.

Figure 4:
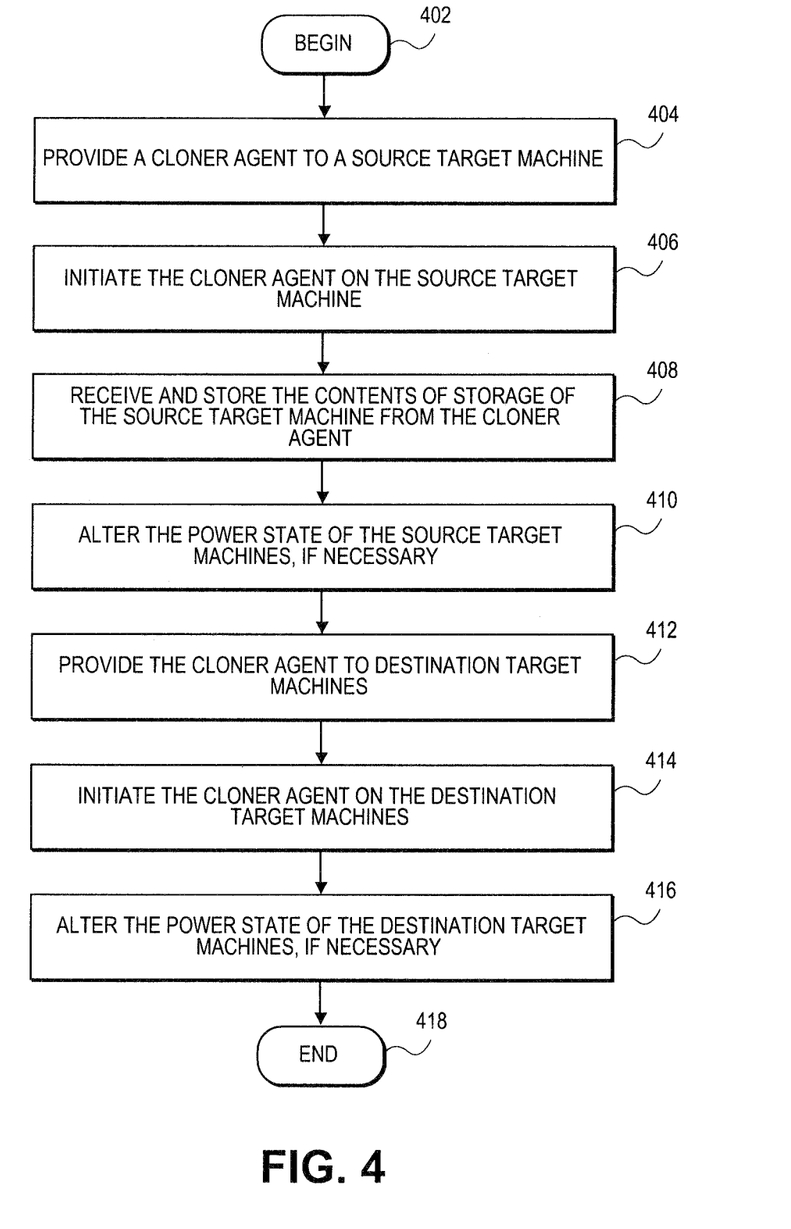
FIG. 4 illustrates a flowchart for cloning target machines, according to various embodiments.

FIG. 4 illustrates a flow diagram for cloning target machines in the provisioning environment 200, according to embodiments of the present teachings. In 402, the process can begin. In 404, the cobbler server 102 can provide the cloner agent 230 to a source target machine. For example, the cobbler server 102 can transfer the cloner agent 230 by a network protocol, such as PXE. Likewise, the cobbler server 102 can utilize the network management server 205 and/or a koan client to provide the loner agent 230.

In 406, the cobbler server 102 can initiate the cloner agent 230 on the source target machine. For example, the cobbler server 102 can instruct the power management system 225 to power cycle the source target machine to initiate the cloner agent 230, if necessary. Then, in 408, the cobbler server 102 can receive and store the content of the storage of the source target machine. For example, prior to providing the cloner agent 230, the cobbler server 102 can specify the storage location 235 in the cloner agent 230. The cloner agent 230 can copy the file system, partition by partition and/or disk by disk, to the storage space 235.

In 410, the cobbler server 102 can alter the power state of the source target machine, if necessary. For example, the cobbler server 102 can, again, instruct the power management system 225 to power cycle the source target machine in order to place the source target machine back into normal operation.

In 412, the cobbler server 102 can provide the cloner agent 230 to destination target machines. For example, the cobbler server 102 can transfer the cloner agent 230 by a network protocol, such as PXE. Likewise, the cobbler server 102 can utilize the network management server 205 and/or a koan client to provide the cloner agent 230.

In 414, the cobbler server 102 can initiate the cloner agent 230 on the destination target machines. For example, once the cloner agent 230 is transferred, the cobbler server 102 can instruct the power management system 225 to power cycle the set of destination target machines, again, to initiate the cloner agent 230, if necessary. Once initiated, the cloner agent 230 can copy the contents of the storage space 235 to the storage devices and media of the destination target machines. For instance, the cloner agent 230 can copy the file system, partition by partition and/or disk by disk, from the storage space 235 to the destination target machines.

In 416, the cobbler server 102 can alter the power state of the destination target machines. For example, after copying is completed, the cobbler server 102 can, again, instruct the power management system 225 to power cycle the destination target machines in order to start the destination target machines as clones of the source target machines. In 418, the process can end, but the process can return to any point and repeat.

Certain embodiments may be performed as a computer application or program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself as an abstract entity, is a computer readable medium. The same is true of computer networks in general.

While the invention has been described with reference to the exemplary embodiments thereof those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method comprising:
providing an agent to a first target machine in a network of target machines, wherein the agent is to copy a file system of the first target machine;
receiving the file system that was copied by the agent;
associating the file system with a profile of an operating system type of target machines in the network of target machines, wherein the profile represents a function performed by the type of target machines;
receiving a request to provision software to a second target machine in the network of target machines in view of the profile; and
providing, by a processor, the agent to the second target machine, wherein the agent is to transfer the file system to the second target machine, and wherein the agent is removed after the transfer is complete and a power state of the second target machine is altered according to a first power cycling instruction to start the second target machine.

2. The method of claim 1, the method further comprising storing the file system in a storage device.

3. The method of claim 1, the method further comprising instructing a power management system associated with the first target machine to alter a power state of the first target machine according to a second power cycling instruction to initiate the agent.

4. The method of claim 1, the method further comprising instructing a power management system associated with the second target machine to alter the power state of the second target machine according to a third power cycling instruction to initiate the agent.

5. The method of claim 1, wherein the agent is a disk image containing the agent.

6. The method of claim 1, wherein providing the agent comprises instructing a network management server or a helper client on the first target machine to retrieve the agent.

7. The method of claim 1, wherein providing the agent comprises:
instructing a power management system associated with the first target machine to alter a power state according to a fourth power cycling instruction of the first target machine to initiate providing the agent; and
transmitting the agent to the first target machine over the network.

8. A system comprising:
a network interface to a network of target machines; and
a processor to communicate with the network interface and a network management server, the processor to:
provide an agent to a first target machine in the network of target machines, wherein the agent is to copy file system of the first target machine;
receive the file system that was copied by the agent;
associate the file system with a profile of an operating system class of machines in the network of target machines, wherein the profile represents a function performed by the type of target machines;
receive a request to provision software to a second target machine in the network of target machines in view of the profile, and
provide the agent to the second target machine, wherein the agent is to transfer the file system to the second target machine, and wherein the agent is removed after the transfer is complete and a power state of the second target machine is altered according to a first power cycling instruction to start the second target machine.

9. The system of claim 8, the processor further to store the file system in a storage device.

10. The system of claim 8, the processor further to instruct a power management system associated with the first target machine to alter a power state of the first target machine according to a second power cycling instruction to initiate the agent.

11. The system of claim 8, the processor further to instruct a power management system associated with the second target machine to alter the power state according to a third power cycling instruction of the second target machine to initiate the agent.

12. The system of claim 8, wherein the agent is a disk image containing the agent.

13. The system of claim 8, wherein to provide the agent, the processor is to instruct the network management server or a helper client on the first target machine to retrieve the agent.

14. The system of claim 8, wherein to provide the agent, the processor is to:
instruct a power management system associated with the first target machine to alter a power state of the first target machine according to a fourth power cycling instruction to initiate providing the agent; and
transmit the agent to the first target machine over the network.

15. A non-transitory computer readable storage medium comprising executable instructions that, when executed by a processor, cause the processor to:
provide, by the processor, an agent to a first target machine in a network of target machines, wherein the agent is to copy file system of the first target machine;
receive the file system that was copied by the agent;
associate, by the processor, the file system with a profile of an operating system type of target machines in the network of target machines, wherein the profile represents a function performed by the type of target machines;
receive a request to provision software to a second target machine in the network of target machines in view of the profile; and
provide, by the processor, the agent to the second target machine, wherein the agent is to transfer the file system to the second target machine, and wherein the agent is removed after the transfer is complete and a power state of the second target machine is altered according to a first power cycling instruction to start the second target machine.

16. The non-transitory computer readable storage medium of claim 15, the processor is further to:
store the file system in a storage device.

17. The non-transitory computer readable storage medium of claim 15, the processor is further to:
instruct, by the processor, a power management system associated with the first target machine to alter a power state of the first target machine according to a second power cycling instruction to initiate the agent.

18. The non-transitory computer readable storage medium of claim 15, the processor is further to:
instruct, by the processor, a power management system associated with the second target machine to alter the power state of the second target machine according to a third power cycling instruction to initiate the agent.

19. The non-transitory computer readable storage medium of claim 15, wherein the agent is a disk image containing the agent.

20. The non-transitory computer readable storage medium of claim 15, wherein to provide the agent, the processor is to:
instruct, by the processor, a network management server or a helper client on the first target machine to retrieve the agent.

21. The non-transitory computer readable storage medium of claim 15, wherein to provide the agent, the processor is to:
instruct, by the processor, a power management system associated with the first target machine to alter a power state of the first target machine according to a fourth power cycling instruction to initiate providing the agent; and
transmit the agent to the first target machine over the network.

* * * * *